Jan. 25, 1938.   T. MATTHEW   2,106,222
STORAGE BATTERY
Filed March 10, 1934   3 Sheets-Sheet 1
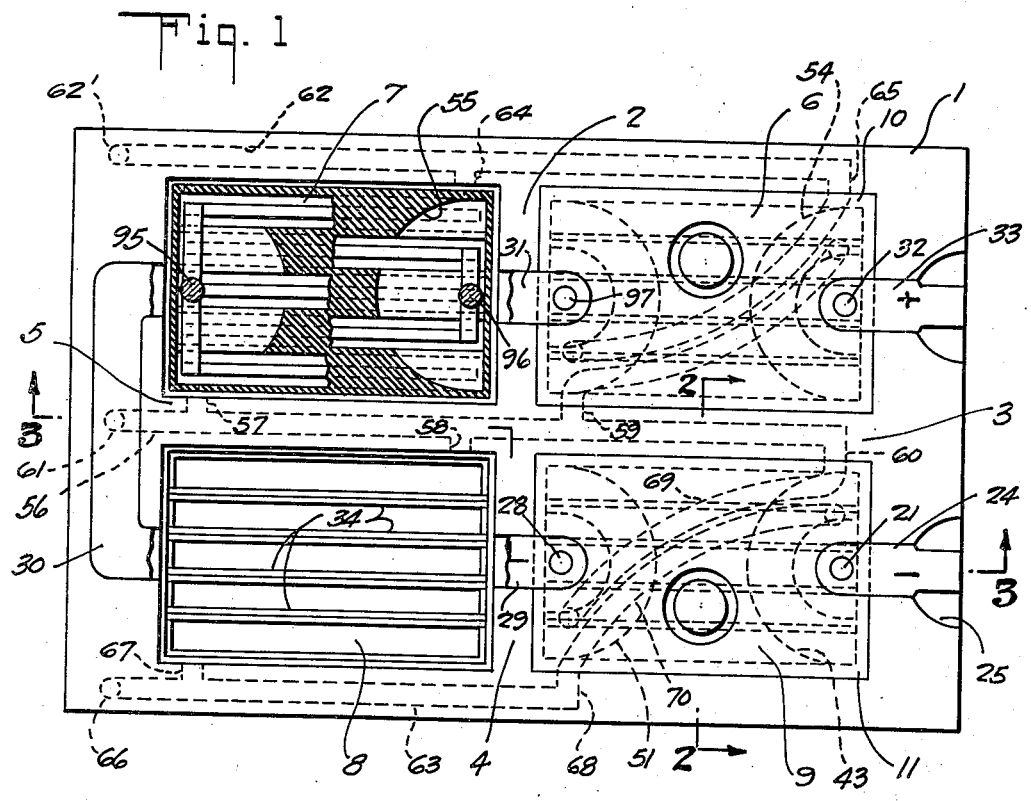
Fig. 1
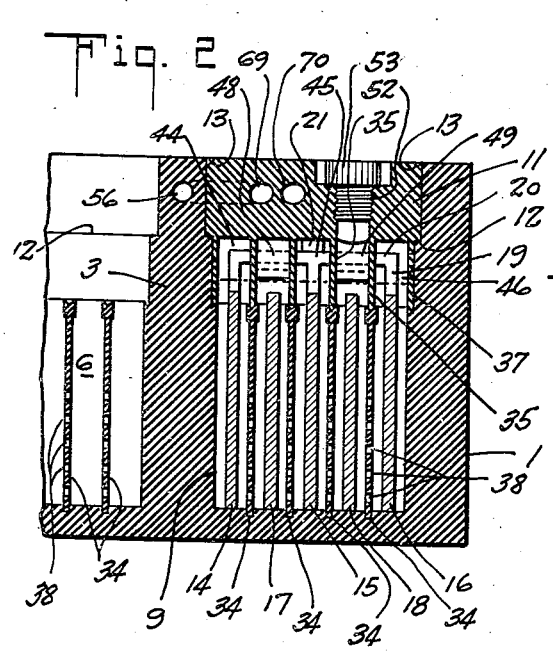
Fig. 2
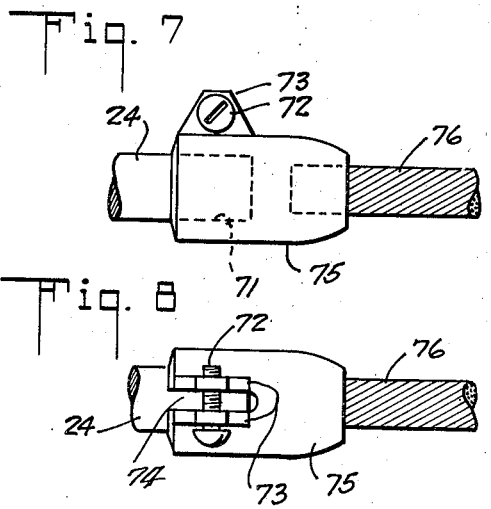
Fig. 7
Fig. 8
INVENTOR
Theodore Matthew
BY John Flam
ATTORNEY Jan. 25, 1938.　　　T. MATTHEW　　　2,106,222
STORAGE BATTERY
Filed March 10, 1934　　　3 Sheets-Sheet 2
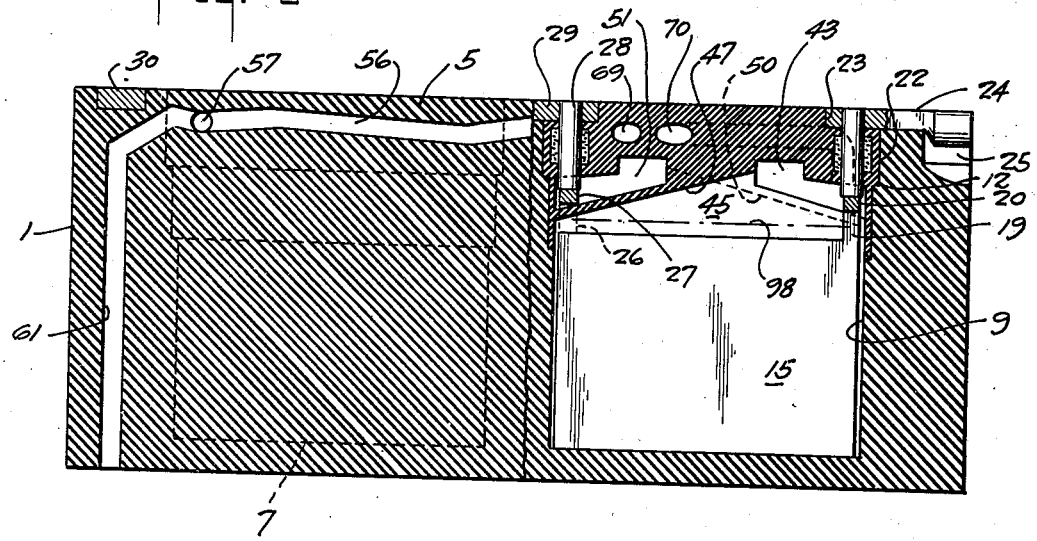
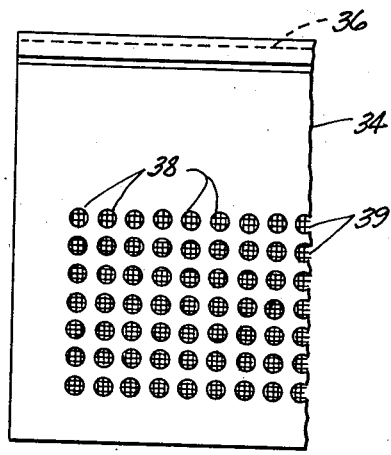
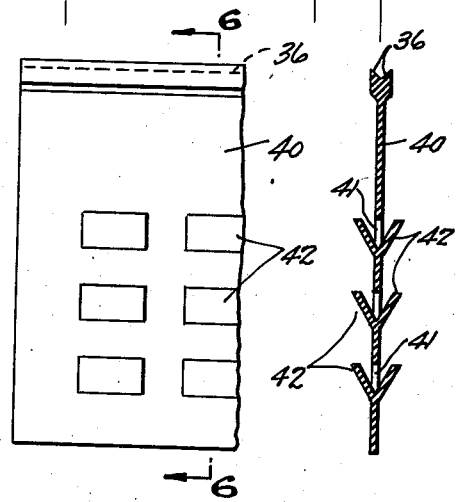
INVENTOR
Theodore Matthew
BY John Flam
ATTORNEY

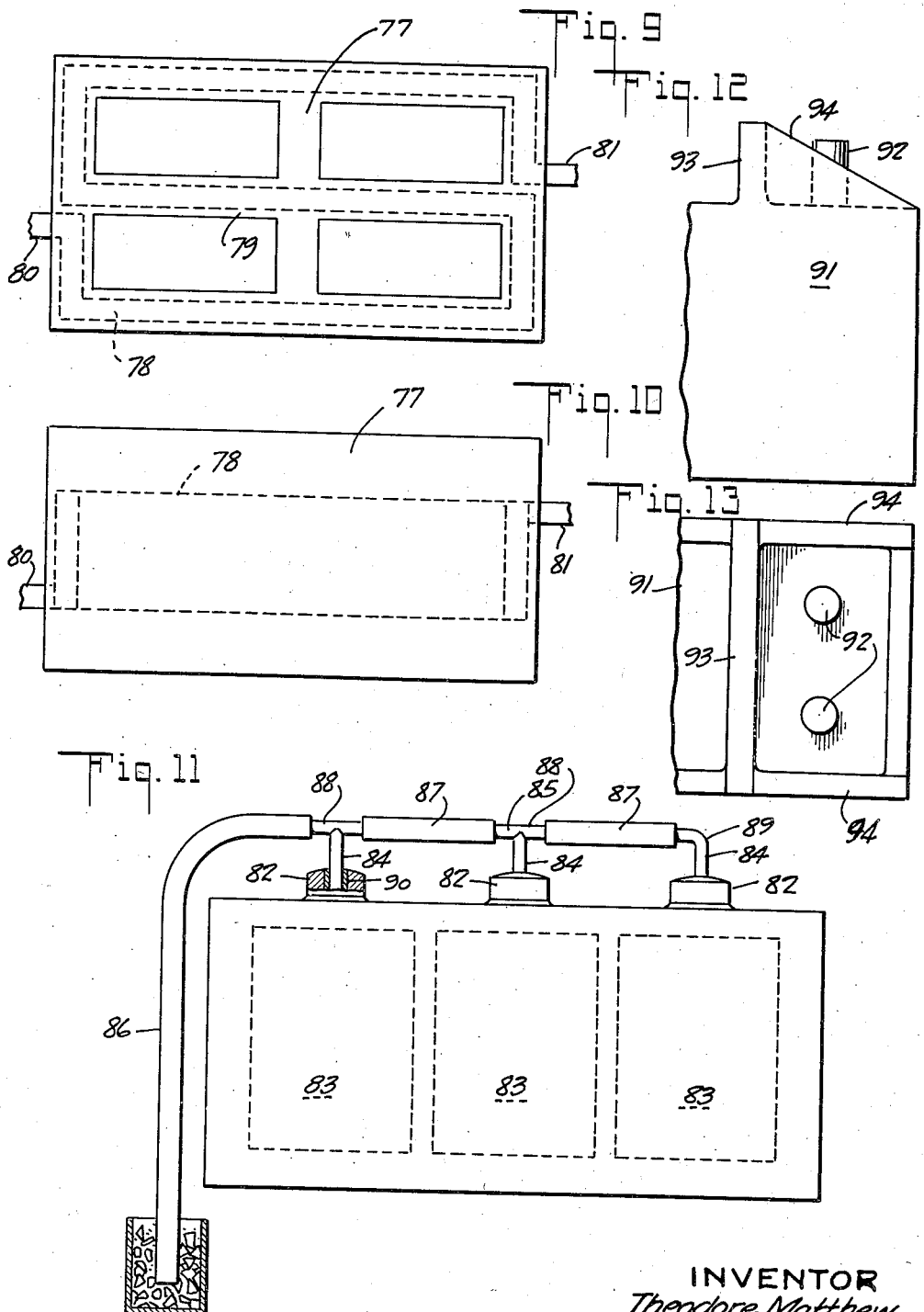

Patented Jan. 25, 1938

2,106,222

UNITED STATES PATENT OFFICE 2,106,222

STORAGE BATTERY

Theodore Matthew, Burlingame, Calif.

Application March 10, 1934, Serial No. 714,972

1 Claim. (Cl. 136—177)

This invention relates to devices utilizing electrolytes, with attendant evolution of gases, such for example as storage batteries.

In the majority of instances, such batteries depend for their operation upon electro-chemical changes of a metal and a metallic compound, appropriately supported on plates, immersed in an acidic or basic electrolyte. The most common electrolyte is an aqueous solution of sulfuric acid.

It is a common experience in connection with such batteries to find that the terminals (especially the positive terminal) are quickly corroded or oxidized. This necessitates quite frequent inspection and cleaning. It is one of the objects of this invention to obviate or at least greatly retard this oxidation or corrosion.

Careful observation has shown that most of this oxidation or corrosion is traceable to the evolution of fumes in the battery and their passage through the breather holes in the filler or inspection caps, to the exposed terminal surfaces. When sulfuric acid is used in the battery, the fumes or gases and vapors evolved include sulfur trioxide and moisture, having a strong oxidizing and corroding effect. It is accordingly another object of this invention to reduce corrosion of the battery terminals by protecting the terminals from those gases and vapors; as for example by collecting and leading off the fumes to a place where they are rendered innocuous.

It is another object of the invention to prevent the formation of any explosive mixture of the gases evolved. Ordinarily, due to the electrolytic action of the current flowing through the battery during charging periods, oxygen is evolved at one set of plates, and hydrogen at the other set. A mixture of hydrogen with oxygen may be highly explosive. By the aid of this invention, such dangerous mixtures are effectively prevented.

It is still another object of this invention to improve in general, the construction of the battery.

It is still another object of the invention to provide a novel and inexpensive cooling system for the battery. Such a system is of particular application where the battery is used in confined places, as in submarines, and serves in addition, to increase the efficiency of operation of such batteries.

It is still another object of the invention to provide a battery in which the danger of spilling the electrolyte is eliminated.

It is still another object of the invention to provide separate compartments for each battery plate, the compartments being connected for interchange of liquid, but retarding passage of gases between the compartments. In this way, the formation of sediment is retarded and the possibility of shorting the cell or of current leakage inside the cell is materially reduced.

It is still another object of this invention to make it possible to utilize the gas or fume collecting features in connection with present types of batteries, by providing readily installable apparatus therefor.

This invention possesses many other advantages, and has other objects which may be made more easily apparent from a consideration of several embodiments of the invention. For this purpose there are shown a few forms in the drawings accompanying and forming part of the present specification. These forms shall now be described in detail, illustrating the general principles of the invention; but it is to be understood that this detailed description is not to be taken in a limiting sense, since the scope of the invention is best defined by the appended claim.

Referring to the drawings:

Figure 1 is a top view of a battery incorporating the invention, the upper left hand cell of the battery having its top broken away to expose the arrangement of the plates; and the lower left hand portion showing a battery cell with the battery plates and cover omitted;

Fig. 2 is a section taken along plane 2—2 of Fig. 1;

Fig. 3 is a section taken along plane 3—3 of Fig. 1;

Fig. 4 is a fragmentary elevation of one of the separator plates used in the battery;

Fig. 5 is a view similar to Fig. 4, but showing a modified form of separator plate;

Fig. 6 is a sectional view, taken along plane 6—6 of Fig. 5;

Figs. 7 and 8 are side and top views respectively of a connector used in connection with the battery;

Fig. 9 is a diagrammatic top plan view showing a form of the battery in which a refrigerating medium is used;

Fig. 10 is a diagrammatic side elevation of the battery shown in Fig. 9;

Fig. 11 is a side elevation of a modified form of battery;

Fig. 12 is a fragmentary side elevation of a further modification; and

Fig. 13 is a fragmentary top plan view of the battery shown in Fig. 12.

In Figs. 1, 2 and 3, there is disclosed a four-cell battery having a casing 1. This casing or box can be made of any appropriate insulation material. There are integrally formed partitions 2, 3, 4 and 5, dividing the battery casing into four cells 6, 7, 8 and 9. Each of these compartments is provided with a cover member, such as 10, 11. These cover members can also be made from appropriate insulation material, such as hard rubber. In order to present a flush upper surface of the battery and thereby to facilitate the maintaining of the battery in clean condition, these covers 11 are sunk into the casing 1, as shown most clearly in Figs. 2 and 3. The covers for example, may rest upon shoulder 12 disposed around the inner wall of each of the cells. The upper corners of the cover members may be beveled as indicated for example at 13 (Fig. 2). The space between the bevel and the casing, which can be filled with a sealing material, renders the battery casing 11 and its cover members fluid and air tight, except for the vents to be hereinafter described.

In the present instance, each cell is shown as having two sets of active plates of the usual form and shown diagrammatically in Fig. 2. Thus one set of plates can comprise the three plates 14, 15 and 16 which alternate with the plates 17, 18. The set of plates 14, 15 and 16 can be the negative plates, and the other set 17, 18 can form the positive plates.

The manner in which these sets of plates are supported will now be described.

Each of the three negative plates 14, 15 and 16 has a riser, such as 19 (Figs. 2 and 3). Connecting all of these risers is a common connection bar 20. To this connection bar 20 there is fastened a terminal post 21 which passes through a recess 22 in the cover 11. Since all of the four cells have substantially identical plate structures, similar reference characters are used to represent similar plate structures in all of the cells.

The top of post 21 is substantially flush with the top of the battery. A recess 23 (Fig. 3) is formed in the top of the battery around the post 21 to permit a terminal bar 24 to be placed in the recess and to encircle the post 21. This connection bar 24 thus has its top surface maintained substantially flush with the top of the battery. A deeper recess 25 can be provided at the right hand upper edge of the battery casing to form a sufficiently large space for the accommodation of appropriate connectors to a battery cable. The terminal bar 24 thus serves as one of the terminals for the entire battery.

In order to protect these members 21, 24 from acid or other electrolyte in the cell, recess 22 is used to accommodate a sulfur seal. This sulfur can, in a fused or plastic state, be placed in the recess 22 just after the insertion of the post 21 therethrough. The surfaces in contact with the sulfur may be made rough in order to fix the post 21 more securely within the recess. The solidified seal also forms an effective sealing means around the post 21 against escape of battery fluid. If desirable, a mixture of sulfur with finely divided metallic substances can be added to the sulfur, that can react with the electrolyte to expand the seal and thus maintain it tight; and to form a chemical compound with the electrolyte, acting as a barrier against further penetration of the electrolyte.

The positive plates 17 and 18 are similarly supported and are provided with risers, such as 26 (Fig. 3). These risers in turn are connected to a common connection bar 27 to which the terminal post 28 is connected. This terminal post is sulphur sealed through the cover 11 in a manner similar to that used in connection with post 21. In this case, however, a jumper connection 29 is used for connecting the positive plates of cell 9 with the negative plates of cell 8. The plates of cell 8 are not shown in Fig. 1, but the construction and manner of support are entirely similar to that disclosed in connection with cell 9. The jumper connection 29 is sunk in flush with the top of the battery and connects the post 28 with a post (such as 21 of the cell 9) cooperating with the negative plates of cell 8.

The terminal and post connections of all of the four cells are substantially identical. The jumper plate 30 serves to connect the positive post of cell 8 with the negative post 95 of cell 7. The positive post 96 at the right hand end of cell 7 is connected by a jumper 31 to the negative post 97 of cell 6. The positive post 32 of this cell has a positive terminal connection 33 similar to terminal connection 24 for the negative side of the battery.

An inspection of Figs. 2 and 3 shows that all of the active plates are supported directly on the bottom of the cell space.

The arrangement is such that individual compartments are provided for each of the plates. This is accomplished by the aid of a series of separator plates, such as 34 (Figs. 1, 2 and 4), which, if desired, might be made integral with the box 1. In the present instance, however, each of these separator plates is shown as accommodated in a groove in the bottom and sides of the cell space. It is furthermore held in place by depending ribs 35 integrally provided on the bottom of the cover 11. These depending ribs have pointed ends accommodated in grooves in the upper end of each of the separator plates. These grooves are shown to best advantage in Fig. 6 in connection with a slightly modified form of a separator plate. As shown in Fig. 6, the top of each separator plate has inclined surfaces 36 forming a wedge shaped groove in the bottom of which the pointed ends of the ribs 35 are accommodated. Furthermore, the cover 11 is provided with a depending flange 37 which fits into a corresponding recess in the inner wall of the cell chamber. The bottom of the flange 37 is slanted upwardly and inwardly to contact with a similarly slanting ledge or shoulder on the wall of the cell chamber.

By the provision of these slanting surfaces at the bottom of the flange 37, and by the provisions of a snug fit between cover 11 and casing 1, the possibility of leaks is obviated.

Similarly, the provision of the pointed ends of ribs 35 and of the upwardly slanting groove surfaces 36 in the separator plates is useful in preventing gases from passing from one plate compartment to the other around the bottoms of the ribs 35.

It is of course understood that a liquid electrolyte such as sulfuric acid fills all of the plate compartments to a height somewhat above the tops of the active plates. The liquid level is indicated by the dotted line 98 in Fig. 3.

In order further to ensure against the passage of gases or gas bubbles from one compartment to another, and yet to permit free passage of electrolyte, there are passageways provided in each of the separator plates 34 in which there are provisions for retarding the passage of gas. For example, in the forms shown in Figs. 2 and 4, the passageways 38 can be covered over with a medium fine screen 39. This is effective to prevent the passage of even very small bubbles, although it does not prevent free interchange of liquid.

It is most convenient to make the separator plates 34 of some usual insulation material, such as a phenolic condensation product, or the like.

A substitute or alternate form of separator plate is illustrated in Figs. 5 and 6. In this form the separator plate 40 is provided with a series of passageways 41 having a tortuous path from one side of the separator to the other, the passageway leading downward at each side of the plate. This is effected by the use of deflectors or baffles 42 inclined upwardly from near the lower edge of each aperture, and overlying the apertures. Any gases evolved in any compartment will bubble off the upper edges of these deflector plates without passing downwardly through the passageways 41.

Similarly, tortuous passageways could be formed between the bottom of each separator plate and the bottom of the battery chamber.

One of the important features of the invention is in the provision of separate venting means for each of the sets of plates in a cell space. Thus the compartments for the negative plates 14, 15 and 16 of Fig. 1 all lead into a common semi-circular recess 43 in the bottom of the cover 11 (Figs. 1 and 3). This semi-circular recess has its diameter disposed adjacent the right hand end of the compartment 9 as shown in Fig. 1. Grooves 44, 45 and 46 defined by the depending flange 37 and the depending ribs 35 lead into this recess. The tops of these grooves are upwardly sloping and form a ceiling or top surface 47 (Fig. 3). In this way gases rising into these grooves 44, 45 and 46 from the negative plate compartments are collected into the annular space 43 adjacent the right hand side of the casing 1.

Similarly, the grooves 48 and 49, formed in the bottom of the cover 11 and above the positive plates 17 and 18 lead to the left hand semi-circular recess 51. These grooves have upwardly sloping top surfaces 50. It is apparent, therefore, that the oxygen evolved at the positive plates, as well as other gases that may be simultaneously evolved will be lead off in each cell into one recess such as 51; and the hydrogen evolved in the negative plate compartments is collected in the opposite recess 43. There is no communication between these recesses, and the gases from these two recesses are separately vented. The sloping ceilings for the grooves form virtually a hood construction, and provide increased opportunity for condensation and return of vapors to the cells of origin.

Furthermore, there is an assurance against the possibility of forming a dangerously explosive mixture. The oxygen of course can be vented directly to the atmosphere if desired, although in the present instance it is vented downwardly and exteriorly of the battery casing. The inspection vents for each of the cell spaces are provided in one of the grooves above a positive plate which contains oxygen whereby inadvertent ignition of any hydrogen-oxygen mixture which is a present danger during inspection is obviated. For example, in cell chamber 9 there is an aperture 52 (Fig. 2) immediately above positive plate 18. This aperture is intended to be closed by a threaded plug 53 of the usual kind except that it has no vent therein. Thus filling and inspection can be accomplished in the usual way by the removal of the plug 53. Equivalent plugs in each of the cell chambers cooperating with a passageway above a positive plate can be provided for the other cell spaces. These plugs are all located in recesses whereby the tops of the plugs are flush with the cell cover, just as the connection bars 24, 29, 30, 31 and 33. The recess for each plug is wide enough to permit ready manual manipulation.

The manner in which the chambers 43, 51 are vented will now be described. The chambers in which oxygen is collected such as 51 for cell space 9, 54 for cell space 6, and 55 for cell space 7 all communicate with a central passageway 56 (Figs. 1 and 3). This passageway extends through the central wall 5 adjacent the top thereof, and has branches 57, 58, 59 and 60 leading respectively to the four oxygen collecting chambers. At the left hand portion of casing 1 the passageway 56 has a downwardly extending portion 61 leading out of the battery and downwardly.

Hydrogen vents are provided similar to passageway 56 but of greater carrying capacity, as there is twice as much hydrogen evolved as oxygen, due to the fact that there are two atoms of hydrogen to each atom of oxygen in a molecule of water, which is being decomposed by the action of the battery. Thus there is a hydrogen vent 62 on one side of the battery and a hydrogen vent 63 on the opposite side of the battery. These vents are both located adjacent the top of the casing 1. Vent 62 has a downwardly directed extension 62' discharging at the bottom of the battery. It has branches 64 and 65 communicating with the hydrogen collecting spaces in the covers for the cell chambers 6 and 7. Similarly, hydrogen vent 63 has a downwardly directed passageway 66 discharging outside of the battery and downwardly. It has branch passageways 67 and 68 communicating with the hydrogen collecting chambers associated with cell spaces 8 and 9. As shown most clearly in Fig. 1, the covers 11 are provided with passageways such as 69 and 70 for completing the vents formed by the conduits 56, 62 and 63 to the proper gas collecting chambers in the bottom portion of the covers. These passageways 69, 70 are purposely made to extend substantially diagonally across the cell chambers. Such an arrangement retards spilling of the electrolyte through the vents.

As thus far described, it is apparent that the gases above the positive and negative plates are separatively collected and separatively vented. Furthermore, they are led downwardly and away from the exposed metallic connection elements, thus preventing corrosion and oxidation. Ordinarily it is not necessary to recombine the oxygen and hydrogen thus collected and to return the water to the batteries, although this may be done if desired.

It is also to be noted that the battery terminals 24 and 33 are placed at the same end of the battery and are opposite to the opening of the vents from the conduits 56, 62 and 63. This provides further assurance against corrosion.

Appropriate connecting means may be provided for connecting members 24 and 33 to the battery cables. Such a device is shown in Figs. 7 and 8. In this form the connector 24 is shown as clamped in a body 75, being disposed in a recess or aperture 71 having a split wall, and clamped as by the aid of a screw 72 passing through ears 73. An aperture or recess 74 is formed axially of the recess 71 but opening on the opposite side of the connector 75. In this recess can be soldered or otherwise permanently joined the battery cable 76.

When using the battery in confined places, such as in submarine installations or the like, the heat evolved by the battery may not be so readily dissipated and may reduce its efficiency to a considerable extent. In Figs. 9 and 10 there is indicated a simple manner of passing a refrigerating medium through the partition walls of the battery casing. The battery casing is shown at 77. A deep, convoluted passageway 78 is formed through the end walls and the intermediate partition 79. An inlet 80 and an outlet 81 may be provided in the form of small conduits at opposite ends of the convoluted conduit 78. In marine work, ordinary sea water could be used as the refrigerating medium, pumped through a chain of batteries by a small pump.

The prevention of corrosion at the terminals of existing batteries can be effectively prevented by the aid of an auxiliary attachment illustrated in Fig. 11. In this form of the invention the vent caps 82 closing each of the cell spaces 83 can be provided with comparatively large apertures fitted with yielding bushings 90. In these bushings can be removably inserted the legs 84 of a manifold 85. This manifold can have a downwardly extending extension 86, discharging the collecting gases either to the atmosphere or to a mass of gas absorbing material. If an acid electrolyte is used, this material can be in the form of sticks of sodium hydroxide; if a basic electrolyte is used, the material can be iron sulfate. The battery terminals being remote from the discharge end are unaffected and will remain uncorroded for a long period. Manifold 85 can be formed of a series of flexible elements, such as 87 slipped over metallic or composition members 88 and 89.

For ensuring against corrosion of the battery terminals, a simplified form of construction is illustrated in Figs. 12 and 13. It has been found that by merely preventing the gases evolved from reaching the terminal posts, much of the corrosion can be prevented. Thus in the battery 91 of Figs. 12 and 13, both battery posts 92 are arranged at one end of the battery, and a vertical barrier 93 is interposed between these posts and the vents. The gases evolved through the vents may reach the barrier 93 but cannot readily reach the posts 92. Preferably the ends of the barrier 92 are carried down as sloping walls 94 on each side of the battery. Furthermore, the post 92 should be placed at the front of the battery when used in automobiles, since then, the air draft thus provided is such as to drive the fumes from the cells away from the posts. Indeed, by placing an ordinary battery in such position in the car that the positive terminal (which is most subject to corrosion) is at the front or advancing end of the battery, most corrosion will be prevented.

By preventing interchange of gas or bubbles between the individual plate compartments, the mudding up of individual cells is materially retarded, and it is unnecessary to keep the active battery plates spaced from the bottom of the chambers. By separate venting as described, dangerous gas mixtures are effectively prevented and corrosion of the battery posts is also obviated. The battery can also be inverted or laid on its side without spilling any electrolyte.

In the first embodiment described four battery cells are shown; but the invention is not limited to any special number. Preferably, an even number is to be used, as then both of the battery terminal posts can be located at the same end of the battery. It is also obvious that any desired number of plates can be used in each cell.

I claim:

In a storage battery having positive and negative plates, a battery casing having separate compartments for the positive and negative plates as well as a flush cover, connection members between the elements of the battery, all of said members being sunk in the cover to maintain its flush characteristics, said members being extended to one end of the casing to form the battery terminals, an electrolyte in which the plates are immersed and which evolves gases of different characteristics at the positive and negative plates incident to the operation of the battery, and means forming vents connecting to the compartments and leading to the opposite end of the casing from that at which the said terminals and downwardly to the outside of the casing, whereby to conduct said gases to the outside of the casing without intermingling and without contacting said members.

THEODORE MATTHEW.